United States Patent
Mueller et al.

(10) Patent No.: US 9,951,243 B2
(45) Date of Patent: Apr. 24, 2018

(54) CARPET COATING COMPOSITIONS OF IMPROVED STABILITY FORMED FROM VINYL ACETATE/ETHYLENE COPOLYMER DISPERSIONS

(75) Inventors: Harmin Mueller, Hofheim (DE); Paul Stuart Wormald, Frankfurt (DE); Paolo Bavaj, Duesseldorf (DE)

(73) Assignee: CELANESE SALES GERMANY GMBH, Sulzbach (DE)

( * ) Notice: Subject to any disclaimer, the term of this patent is extended or adjusted under 35 U.S.C. 154(b) by 672 days.

(21) Appl. No.: 14/365,385

(22) PCT Filed: Dec. 20, 2011

(86) PCT No.: PCT/IB2011/003377
§ 371 (c)(1),
(2), (4) Date: Jul. 24, 2014

(87) PCT Pub. No.: WO2013/093547
PCT Pub. Date: Jun. 27, 2013

(65) Prior Publication Data
US 2014/0349060 A1    Nov. 27, 2014

(51) Int. Cl.
*C09D 131/04* (2006.01)
*D06N 7/00* (2006.01)
*C09D 101/28* (2006.01)

(52) U.S. Cl.
CPC ......... *C09D 131/04* (2013.01); *C09D 101/28* (2013.01); *D06N 7/0073* (2013.01); *D06N 2203/042* (2013.01); *D06N 2203/045* (2013.01); *D06N 2209/165* (2013.01); *D10B 2503/042* (2013.01); *Y10T 428/23986* (2015.04); *Y10T 428/23993* (2015.04); *Y10T 428/31938* (2015.04); *Y10T 442/20* (2015.04)

(58) Field of Classification Search
CPC .. C09D 131/04; C09D 101/26; C09D 101/28; D06N 2203/042; D06N 2203/045; D06N 2209/165; D06N 7/0073; Y10T 428/23986; Y10T 428/23993; Y10T 442/20
USPC .............. 428/97, 96; 524/832, 745
See application file for complete search history.

(56) References Cited

U.S. PATENT DOCUMENTS

| | | | |
|---|---|---|---|
| 4,228,277 A | 10/1980 | Landoll | |
| 4,352,916 A | 10/1982 | Landoll | |
| 4,684,704 A | 8/1987 | Craig | |
| 4,735,986 A | 4/1988 | Lacoviello | |
| 5,022,948 A | 6/1991 | Hallworth | |
| 5,026,765 A | 6/1991 | Katz et al. | |
| 5,143,966 A * | 9/1992 | Lee | C08F 218/08 524/459 |
| 5,198,277 A * | 3/1993 | Hamilton | B32B 5/26 156/72 |
| 5,560,972 A | 10/1996 | Blakely et al. | |
| 5,849,389 A | 12/1998 | Lunsford | |
| 6,359,076 B1 | 3/2002 | Lunsford et al. | |
| 6,673,862 B1 * | 1/2004 | Smith | C08F 218/08 524/457 |
| 7,358,297 B2 * | 4/2008 | Muller | C08F 2/24 524/459 |
| 8,785,540 B2 * | 7/2014 | Muller | C08F 218/08 524/457 |
| 2005/0043463 A1 * | 2/2005 | Muller | C08F 2/24 524/459 |
| 2008/0039572 A1 * | 2/2008 | Mueller | C08F 218/08 524/457 |
| 2008/0044565 A1 * | 2/2008 | Mueller | C09D 131/04 427/207.1 |
| 2011/0045211 A1 | 2/2011 | Zhang et al. | |
| 2012/0009379 A1 * | 1/2012 | Muller | C08F 218/08 428/96 |
| 2013/0149487 A1 * | 6/2013 | Lunsford | D06N 7/0063 428/96 |
| 2013/0177733 A1 * | 7/2013 | Muller | D06N 3/0006 428/95 |
| 2013/0338253 A1 * | 12/2013 | Krieger | C08K 5/5419 523/122 |
| 2015/0125649 A1 * | 5/2015 | Lunsford | C09D 131/04 428/97 |
| 2015/0322279 A9 * | 11/2015 | Lunsford | C09D 131/04 428/97 |

(Continued)

FOREIGN PATENT DOCUMENTS

WO    2011140065 A2    11/2011

OTHER PUBLICATIONS

International Search Report and Written Opinion issued in a corresponding PCT/IB2011/003377 dated Nov. 4, 2013.

*Primary Examiner* — Cheryl Juska
(74) *Attorney, Agent, or Firm* — Roberts Mlotkowski Safran Cole & Calderon, P.C.

(57) ABSTRACT

Disclosed are aqueous carpet-coating compositions suitable for use as binders or adhesives in carpet products. Such compositions, prior to being applied to carpet substrates and cured, comprise: A) a selected type of vinyl acetate/ethylene (VAE) copolymer dispersion which has been stabilized with emulsifiers and a cellulose ether-based protective colloid, and B) at least one carbon black based filler in the form of a dispersion/slurry with a solids content between 20 and 70%. These coating compositions exhibit especially desirable initial viscosity and viscosity stability characteristics. Carpet products which utilize such coating compositions to provide binder and/or adhesive layer within the carpet are also disclosed. Such carpet products can have desirable odor-controlling and odor-absorbing properties.

14 Claims, No Drawings

(56) References Cited

U.S. PATENT DOCUMENTS

2016/0052106 A1* 2/2016 Woo ................... B24D 11/001
                                                                                 451/532

\* cited by examiner

CARPET COATING COMPOSITIONS OF IMPROVED STABILITY FORMED FROM VINYL ACETATE/ETHYLENE COPOLYMER DISPERSIONS

CROSS-REFERENCE TO RELATED APPLICATIONS

The present Application is a U.S. National Phase of PCT/IB2011/003377 filed on Dec. 20, 2011. The disclosure of the PCT Application is hereby incorporated by reference into the present Application.

FIELD

The present development relates to coating compositions for carpet products. Such compositions comprise an emulsifier- and colloid-stabilized vinyl acetate/ethylene copolymer-containing dispersion and a particulate filler material. Such compositions have desirable viscosity stability and can be used to impart odor-absorbing and odor-controlling properties to carpet products having such compositions applied thereto as binder and/or adhesive coating layers.

BACKGROUND

Most conventional carpets comprise a primary backing with yarn tufts in the form of cut or uncut loops extending upwardly from this backing to form a pile surface. Other carpets are needle felt carpets, which are produced by compressing fibers onto textiles or other backing materials and then applying a binding agent so that the fibers are attached to the backing more durably.

Many residential and commercial carpets are also manufactured with a woven scrim (typically made from polypropylene) attached to the back of the carpet to provide dimensional stability to the carpet. These are dual layer products, where two coating layers (precoat for tuft anchorage and adhesive for scrim fixation) are added wet, and the scrim is added afterwards. After optional fixation of the scrim, the carpet is cured at 130 to 200° C. for a certain time.

Where applicable, for both the pre-coat and the adhesive layer, the physical properties of the binder are important to their successful utilization as carpet coatings. In this regard, there are a number of important requirements which must be met by such coatings. The coating must be capable of being applied to the carpet and dried using the processes and equipment conventionally employed in the carpet industry for latex, e.g. emulsion, coating. The binder composition must provide excellent adhesion to the pile fibers to secure them firmly in the backing. Further, coatings used as adhesives must also be able to secure substrates to the carpet secondary backing, thereby enabling the preparation of material for use in wall-to-wall carpeting.

The binders in coating and adhesive compositions for carpet materials are frequently emulsion polymers, i.e., latex dispersions, such as styrene-based emulsion copolymers like styrene-butadiene latex (SBL) materials or such as acrylic polymer latex dispersions. Copolymers of vinyl esters (such as vinyl acetate and vinyl verstate) and vinyl ester/ethylene can also be used and can frequently have cost and performance advantages such as flame retardancy over styrene-based coatings and adhesives such as SBL. For example, vinyl ester copolymers can be used to provide carpet products which are desirably low in VOC (volatile organic compound) content and which do not contain potentially toxic materials such as 4-phenyl cyclohexene (4-PCH) and related compounds which can be found in styrene-butadiene-based polymer dispersions. Vinyl ester copolymers form carpet coating and adhesive layers which are also advantageously resistant to degradation by visible light and/or ultraviolet (UV) radiation.

Carpet coating compositions based on vinyl ester/ethylene, e.g., vinyl acetate/ethylene (VAE), copolymers and also containing a variety of filler materials are disclosed, for example, in U.S. Pat. Nos. 5,026,765; 5,849,389; and 6,359,076. In U.S. Pat. No. 4,735,986, there are disclosed carpet backing adhesive compositions comprising vinyl acetate/ethylene copolymer emulsions and relatively large amounts of fillers. By utilizing VAE copolymer emulsions which have been stabilized with both nonionic surfactants and various forms of hydrolyzed polyvinyl alcohol, the '986 patent carpet adhesive compositions are realized which have acceptable viscosity characteristics and hence desirable compatibility between the VAE copolymer and filler material.

Notwithstanding the availability of carpet coating compositions containing both VAE copolymer binding agents and various types of filler materials, it would be advantageous to provide additional VAE-based carpet coating compositions which comprise certain selected types of filler material. Such selected types of filler material would be those like particulate carbon or fly ash materials that can impart odor-controlling and odor-absorbing properties to carpet products having such compositions incorporated therein. And it would be further advantageous to provide carpet coating compositions of this type which have acceptable viscosity characteristics such that they can be effectively supplied and applied to carpet products via conventional commercial scale carpet coating procedures and equipment. By selecting and combining certain types of surfactant- and colloid-stabilized VAE-based copolymer emulsions and certain types of filler materials, such desirable carpet coating compositions and carpet products can be realized as described hereinafter.

SUMMARY

In one aspect, the present development is directed to aqueous carpet coating compositions suitable for use as binders or adhesives in carpet products. Such compositions, prior to being applied to carpet substrates and cured, comprise: A) an emulsifier- and protective colloid-stabilized vinyl acetate/ethylene (VAE) copolymer dispersion, B) at least one carbon black based filler and optionally C) a further particulate filler material other than carbon black selected from particulate inorganic compounds and combinations of particulate inorganic compounds with particulate plastic material.

The vinyl acetate/ethylene copolymer in the copolymer dispersion comprises main co-monomers which include vinyl acetate, which is copolymerized with ethylene and optionally copolymerized also with one or more additional different non-functional main co-monomer(s). Such additional non-functional main co-monomer(s) can be vinyl esters of $C_1$-$C_{18}$ mono-carboxylic acids or $C_1$-$C_{18}$ esters of ethylenically unsaturated mono-carboxylic acids or $C_1$-$C_{18}$ diesters of ethylenically unsaturated di-carboxylic acids. This vinyl ester/ethylene copolymer furthermore has a glass transition temperature, $T_g$, between about 0° C. to about 25° C.

The carbon black is a dispersion/slurry with a solid content between 20 and 70%.

The optional further inorganic particulate filler component of the compositions comprises at least some fly ash and/or particulate carbon material. Preferably, the particulate filler will comprise particulate carbon material which imparts odor-absorbing and/or odor-controlling properties to carpet products treated with the coating compositions herein.

The coating compositions herein have a Brookfield viscosity upon initial preparation of from about 500 mPa·s to 10.000 mPa·s at 25° C. Such compositions will generally vary in Brookfield viscosity by no more than about 100% after storage for up to about 7 days at a temperature of about 25° C.

The present compositions exhibit very good stability with carbon black. The stability can be measured by a viscosity increase with time and/or by grit/coagulum formation.

In another aspect, the present development is also directed to carpet products comprising at least one flexible substrate and at least one binder coating layer associated with the at least one flexible substrate, wherein the binder coating layer is formed from an aqueous coating composition of the type described herein.

DETAILED DESCRIPTION

The aqueous coating compositions herein contain a specific type of vinyl ester-based copolymer dispersion as the coating- or binder-forming component thereof, together with a carbon black dispersion/slurry and optionally a selected type of particulate filler material. The components and preparation of such aqueous coating compositions, the copolymer dispersion and filler components thereof, the rheology of the resulting compositions, and carpet products having at least one binder coating and/or adhesive layer formed from these compositions are all described in detail as follows:

Copolymer Dispersion

The coating- and binder-forming component of the aqueous compositions applied to carpet flexible substrates(s) herein is a vinyl acetate-based copolymer comprising ethylene and optionally one or more additional non-functional main co-monomers. This vinyl acetate/ethylene copolymer is present in a copolymer dispersion prepared by the emulsion polymerization of appropriately selected co-monomers.

The primary co-monomer used in the preparation of the copolymer dispersion is vinyl acetate. This primary vinyl acetate co-monomer is generally present in the copolymer of the dispersion in amounts of from about 40% to about 95% by weight, more preferably from about 60% to 75% by weight, based on the total main co-monomers in the copolymer. The second essential co-monomer for incorporation into the copolymer of the dispersion is ethylene. The ethylene will generally comprise from about 5% to about 25% by weight, preferably 8% to about 20% by weight, most preferably from about 10% to about 15% by weight, based on the total main co-monomers in the copolymer.

The vinyl acetate/ethylene copolymer of the copolymer dispersion can optionally comprise one or more additional non-functional main co-monomers besides vinyl acetate and ethylene. One type of such optional main non-functional co-monomer comprises vinyl ester co-monomers. Examples thereof are vinyl esters of monocarboxylic acids having one to eighteen carbon atoms (except vinyl acetate), e.g. vinyl formate, vinyl propionate, vinyl butyrate, vinyl isobutyrate, vinyl benzoate, vinyl-2-ethyl-hexanoate, vinyl esters of an [alpha]-branched carboxylic acid having 5 to 11 carbon atoms in the acid moiety, e.g., Versatic™ acids, and the vinyl esters of pivalic, 2-ethylhexanoic, lauric, paimitic, myristic, and stearic acid. Vinyl esters of Versatic™ acids, more particularly VeoVa™ 9, VeoVa™ 10, and VeoVa™ 11, are preferred.

Another type of optional main non-functional co-monomer which can be incorporated into the vinyl acetate/ethylene copolymer of the dispersion comprises esters of ethylenically unsaturated mono-carboxylic acids or diesters of ethylenically unsaturated di-carboxylic acids. Particularly advantageous co-monomers of this type are the esters of alcohols having one to eighteen carbon atoms. Examples of such non-functional, main co-monomers include methyl methacrylate or acrylate, butyl methacrylate or acrylate, 2-ethylhexyl methacrylate or acrylate, dibutyl maleate and/or dioctyl maleate.

Combinations of two or more of the forgoing optional non-functional main co-monomer types can be co-polymerized into the vinyl acetate/ethylene copolymer. If present, such non-functional main co-monomers can comprise up to about 40 wt % based on total main co-monomers in the copolymer. More preferably, such non-functional main co-monomers can comprise from about 5 wt % to about 20 wt %, based on the total main co-monomers in the vinyl acetate/ethylene copolymer.

The vinyl acetate/ethylene emulsion copolymer used in the carpet products herein can also optionally contain relatively minor amounts of other types of co-monomers besides vinyl acetate, ethylene or other main co-monomer types. Such other optional co-monomers will frequently be those which contain one or more functional groups and can serve to provide or facilitate cross-linking between copolymer chains within the copolymer dispersion-containing aqueous composition, or upon the drying or curing of films and coatings formed from such compositions.

Such optionally present, functional co-monomers can include ethylenically unsaturated acids, e.g. mono- or di-carboxylic acids, sulfonic acids or phosphonic acids. In place of the free acids, it is also possible to use their salts, preferably alkali metal salts or ammonium salts. Examples of optional functional co-monomers of this type include acrylic acid, methacrylic acid, crotonic acid, maleic acid, fumaric acid, itaconic acid, vinylsulfonic acid, vinylphosphonic acid, styrenesulfonic acid, monoesters of maleic and/or fumaric acid, and of itaconic acid, with monohydric aliphatic saturated alcohols of chain length $C_1$-$C_{18}$, and also their alkali metal salts and ammonium salts, or (meth)acrylic esters of sulfoalkanols, an example being sodium 2-sulfoethyl methacrylate.

Other types of suitable optional functional co-monomers include ethylenically unsaturated co-monomers with at least one amide-, epoxy-, hydroxyl, trialkoxysilane- or carbonyl group. Particularly suitable are ethylenically unsaturated epoxide compounds, such as glycidyl methacrylate or glycidyl acrylate. Also suitable are hydroxyl compounds including methacrylic acid and acrylic acid $C_1$-$C_9$ hydroxyalkyl esters, such as n-hydroxyethyl, n-hydroxypropyl or n-hydroxybutyl acrylate and methacrylate. Other suitable functional co-monomers include compounds such as diacetone acrylamide and acetylacetoxyethyl acrylate and methacrylate; and amides of ethylenically unsaturated carboxylic acids, such as acrylamide or meth acrylamide.

As noted, the emulsion copolymer used herein can optionally contain trialkoxysilane functional co-monomers. Alternatively, the emulsion copolymers used herein can be substantially free of silane-based co-monomers.

One type of functional co-monomer which should not be incorporated into the vinyl acetate/ethylene copolymers used herein comprises any co-monomer which contains cross-linkable moieties that generate formaldehyde upon formation of the coating or adhesive layer from compositions containing such copolymers. Thus the vinyl acetate/ethylene copolymer in the copolymer dispersion are preferably substantially free of such co-monomers, which include, for example, common cross-linkers like N-methylolacrylamide (NMA) or even low formaldehyde versions of N-methylolacrylamide such as NMA-LF.

Optional functional co-monomers can be incorporated into the vinyl acetate/ethylene emulsion copolymers used herein in amount of up to about 5 wt %, based on total main co-monomers in the copolymer. More preferably, optional functional co-monomers can comprise from about 0.5 wt % to about 2 wt %, based on total main co-monomers in the copolymer.

The emulsion copolymer can be formed within the copolymer dispersion using emulsion polymerization techniques described more fully hereinafter. Within the copolymer dispersion, the copolymer will be present in the form of particles ranging in weight average particle size, $d_w$, of from about 50 nm to about 800 nm, measured by laser aerosol spectroscopy or another suitable method. More preferably, the copolymer dispersion will be present in the form of particles ranging in weight average particle size, $d_w$, of from about 200 nm to about 500 nm Particle size can be determined by means of laser aerosol spectroscopy techniques.

Depending upon co-monomer type, solubility and the monomer feeding techniques employed, the vinyl ester-ethylene based copolymer can be either homogeneous or heterogeneous in monomeric configuration and make-up. Homogeneous copolymers will have a single discreet glass transition temperature, $T_g$, as determined by differential scanning calorimetry techniques. Heterogeneous copolymers will exhibit two or more discreet glass transition temperatures and might lead to core shell particle morphologies. Whether homogeneous or heterogeneous, the vinyl ester-based copolymer used herein will have glass transition temperatures, $T_g$, which range between about 0° C. and 25° C., more preferably between about 5° C. and 15° C. As is known, the $T_g$ of the polymer can be controlled, for example, by adjusting the ethylene content, i.e., generally the more ethylene present in the copolymer relative to other co-monomers, the lower the $T_g$.

Stabilizers for Polymer Dispersions

Both during polymerization and thereafter, the copolymer dispersion used to prepare the aqueous compositions that form the carpet adhesive or coating layers is stabilized in the form of an aqueous copolymer dispersion or latex. The copolymer dispersion therefore will be prepared in the presence of and will contain a stabilization system which generally comprises emulsifiers, in particular nonionic emulsifiers and/or anionic emulsifiers. Mixtures of nonionic and anionic emulsifiers can also be employed.

The amount of emulsifier employed will generally be at least 0.5 wt %, based on the total quantity of main co-monomers in the copolymer dispersion. Generally emulsifiers can be used in amounts up to about 8 wt %, based on the total quantity of main co-monomers in the copolymer dispersion. The weight ratio of emulsifiers nonionic to anionic may fluctuate within wide ranges, between 1:1 and 50:1 for example. The vinyl acetate/ethylene copolymer dispersion will further comprise defined amounts of cellulose ether polymeric stabilizers (protective colloids).

Emulsifiers employed with preference herein are nonionic emulsifiers having alkylene oxide groups and/or anionic emulsifiers having sulfate, sulfonate, phosphate and/or phosphonate groups. Such emulsifiers, if desired, can be used together with molecularly or dispersely water-soluble polymers, preferably together with polyvinyl alcohol. Preferably also the emulsifiers used contain no alkylphenolethoxylates (APEO).

Examples of suitable nonionic emulsifiers include acyl, alkyl, oleyl, and alkylaryl ethoxylates. These products are commercially available, for example, under the name Genapol®, Lutensol® or Emulan®. They include, for example, ethoxylated mono-, di-, and tri-alkylphenols (EO degree: 3 to 50, alkyl substituent radical: $C_4$ to $C_{12}$) and also ethoxylated fatty alcohols (EO degree: 3 to 80; alkyl radical: $C_8$ to $C_{36}$), especially $C_{12}$-$C_{14}$ fatty alcohol (3-40) ethoxylates, $C_{13}$-$C_{15}$ oxo-process alcohol (3-40) ethoxylates, $C_{16}$-$C_{18}$ fatty alcohol (11-80) ethoxylates, $C_{10}$ oxo-process alcohol (3-40) ethoxylates, $C_{13}$ oxo-process alcohol (3-40) ethoxylates, polyoxyethylenesorbitan monoleate with 20 ethylene oxide groups, copolymers of ethylene oxide and propylene oxide having a minimum ethylene oxide content of 10% by weight, the polyethylene oxide (4-40) ethers of oleyl alcohol, and the polyethene oxide (4-40) ethers of nonylphenol. Particularly suitable are the polyethylene oxide (4-40) ethers of fatty alcohols, more particularly of oleyl alcohol, stearyl alcohol or $C_{11}$ alkyl alcohols.

The amount of nonionic emulsifiers used in preparing the copolymer dispersions herein is typically about 1% to about 8% by weight, preferably about 1% to about 5% by weight, more preferably about 1% to about 4% by weight, based on the total main monomer quantity. Mixtures of nonionic emulsifiers can also be employed.

Examples of suitable anionic emulsifiers include sodium, potassium, and ammonium salts of linear aliphatic carboxylic acids of chain length $C_{12}$-$C_{20}$, sodium hydroxyoctadecanesulfonate, sodium, potassium, and ammonium salts of hydroxy fatty acids of chain length $C_{12}$-$C_{20}$ and their sulfonation and/or sulfation and/or acetylation products, alkyl sulfates, including those in the form of triethanolamine salts, alkyl($C_{10}$-$C_{20}$) sulfonates, alkyl($C_{10}$-$C_{20}$) arylsulfonates, dimethyl-dialkyl ($C_8$-$C_{18}$) ammonium chloride, and their sulfonation products, lignosulfonic acid and its calcium, magnesium, sodium, and ammonium salts, resin acids, hydrogenated and dehydrogenated resin acids, and their alkali metal salts, dodecylated sodium diphenyl ether disulfonate, sodium lauryl sulfate, sulfated alkyl or aryl ethoxylate with EO degree between 1 and 10, for example ethoxylated sodium lauryl ether sulfate (EO degree 3) or a salt of a bisester, preferably of a bis-$C_4$-$C_{18}$ alkyl ester, of a sulfonated dicarboxylic acid having 4 to 8 carbon atoms, or a mixture of these salts, preferably sulfonated salts of esters of succinic acid, more preferably salts, such as alkali metal salts, of bis-$C_4$-$C_{18}$ alkyl esters of sulfonated succinic acid, or phosphates of polyethoxylated alkanols or alkylphenols.

The amount of anionic emulsifiers used can typically range from about 0.1% to about 3.0% by weight, preferably from about 0.1% to about 2.0% by weight, more preferably from about 0.5% to about 1.5% by weight, based on the total main monomer quantity. Mixtures of anionic emulsifiers can also be employed.

Along with emulsifiers, the vinyl ester/ethylene copolymer dispersions employed in accordance with the present development will also comprise as part of the stabilizer system a selected type of protective colloid based on cellulose ethers. Such cellulose ether materials will generally be present in comparatively low concentrations, as for example at up to about 4% by weight, based on the total amount of the main monomers used. The vinyl acetate/ethylene copolymer dispersions employed herein will more preferably contain only up to about 3% by weight of cellulose ether protective colloid, based on the total amount of the main co-monomers employed in the vinyl acetate/ethylene copolymer.

Suitable protective colloids used in the copolymer dispersions herein include water-soluble or water-dispersible polymeric modified natural substances based on cellulose ethers. Such cellulose ethers have a viscosity, when tested as a 1 wt % aqueous in water at 25° C., of 5 to 5,000 mPas, preferably of 10 to about 1,500 mPas, more preferably 10 to 500 mPas. Mixtures of celluloses ethers may be used to achieve these viscosity values. Examples of suitable cellulose ether materials include methyl cellulose, hydroxyethyl cellulose, hydroxypropyl cellulose, hydroxypropyl methyl cellulose, ethyl hydroxyethyl cellulose, methyl hydroxyethyl cellulose and combinations of these cellulose ethers. Hydroxyethyl cellulose (HEC), which is commercially available under the tradename Natrosol™ is most preferred.

Hydrophobically modified cellulose ethers may also be employed as the requite protective colloid in the copolymer dispersions herein. Such materials comprise cellulose ethers which have been hydrophobically modified with long chain hydrocarbon groups to reduce their water solubility. Hydrophobically modified cellulose ethers of this type are those described, for example, in U.S. Pat. Nos. 4,228,277; 4,352,916 and 4,684,704; all of which patents are incorporated herein by reference.

The cellulose ether protective colloids can be used individually or in combination. In the case of combinations, the two or more colloids can each differ in their molecular weights or they can differ in their molecular weights and in their chemical composition, such as the degree of hydrolysis, for example.

In addition to the emulsifiers and cellulose ether protective colloids that are used during the emulsion polymerization of the copolymers herein, it is also possible for the vinyl acetate/ethylene copolymer dispersions used herein to contain subsequently added water-soluble or water-dispersible polymers as hereinafter described. Additional emulsifiers and other stabilizers may also be added to the dispersions post-polymerization.

Copolymer Dispersion Preparation

The copolymer dispersions comprising the vinyl acetate/ethylene copolymers described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in U.S. Pat. No. 5,849,389, and in the *Encyclopedia of Polymer Science and Engineering*, Vol. 8, p. 659 ff (1987). The disclosures of both of these publications are incorporated herein by reference in their entirety.

The polymerization may be carried out in any manner known per se in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from about 20° C. to about 150° C., more preferably from about 50° C. to about 120° C. The polymerization generally takes place under pressure if appropriate, preferably from about 2 to about 150 bar, more preferably from about 5 to about 100 bar.

The copolymerisation can be undertaken by batch, semi batch or continuous emulsions polymerization and by processes in which all the monomer is added upfront or by monomer slow add processes.

In a typical polymerization procedure involving, for example, vinyl acetate/ethylene copolymer dispersions, the vinyl acetate, ethylene, and other co-monomers can be polymerized in an aqueous medium under pressures up to about 120 bar in the presence of one or more initiators, at least one emulsifying agent and a cellulose ether protective colloid component. The aqueous reaction mixture in the polymerization vessel can be maintained by a suitable buffering agent at a pH of about 2 to about 7.

The manner of combining the several polymerization ingredients, i.e., emulsifiers, co-monomers, initiators, protective colloids, etc., can vary widely. Generally an aqueous medium containing at least some of the emulsifier(s) and the cellulose ether can be initially formed in the polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

As noted, the polymerization of the ethylenically unsaturated monomers will generally take place in the presence of at least one initiator for the free-radical polymerization of these co-monomers. Suitable initiators for the free-radical polymerization, for initiating and continuing the polymerization during the preparation of the dispersions, include all known initiators which are capable of initiating a free-radical, aqueous polymerization in heterophase systems. These initiators may be peroxides, such as alkali metal and/or ammonium peroxodisulfates, or azo compounds, more particularly water-soluble azo compounds.

As polymerization initiators, it is also possible to use what are called redox initiators. Examples thereof are tert-butyl hydroperoxide and/or hydrogen peroxide in combination with reducing agents, such as with sulfur compounds, an example being the sodium salt of hydroxymethanesulfinic acid, Bruggolite® FF6 and FF7, Rongalit C, sodium sulfite, sodium disulfite, sodium thiosulfate, and acetone-bisulfite adduct, or with ascorbic acid, sodium erythobate, tartaric acid, or with reducing sugars.

The amount of the initiators or initiator combinations used in the process varies within what is usual for aqueous polymerizations in heterophase systems. In general the amount of initiator used will not exceed 5% by weight, based on the total amount of the co-monomers to be polymerized. The amount of initiators used, based on the total amount of the co-monomers to be polymerized, is preferably 0.05% to 2.0% by weight.

In this context, it is possible for the total amount of initiator to be included in the initial charge to the reactor at the beginning of the polymerization. Preferably, alternatively, a portion of the initiator is included in the initial charge at the beginning, and the remainder is added after the polymerization has been initiated, in one or more steps or continuously. The addition may be made separately or together with other components, such as emulsifiers or monomer emulsions. It is also possible to start the emulsion polymerization using a seed latex, for example with about 0.5 to about 15% by weight of the dispersion.

The molecular weight of the various copolymers in the copolymer dispersions herein can be adjusted by adding small amounts of one or more molecular weight regulator substances. These regulators, as they are known, are generally used in an amount of up to 2% by weight, based on the total co-monomers to be polymerized. As regulators, it is possible to use all of the substances known to the skilled artisan. Preference is given, for example, to organic thio compounds, silanes, allyl alcohols, and aldehydes.

The copolymer dispersions as prepared herein will generally have a viscosity which ranges from about 100 mPas to about 5000 mPas at 45-55% solids, more preferably from about 200 mPas to about 4000 mPas, most preferably 400-3000 mPas measured with a Brookfield viscometer at 25° C., 20 rpm, with appropriate spindle. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the copolymer dispersion may be substantially free of thickeners.

Following polymerization, the solids content of the resulting aqueous copolymer dispersions can be adjusted to the level desired by the addition of water or by the removal of water by distillation. Generally, the desired level of polymeric solids content after polymerization is from about 40 weight percent to about 70 weight percent based on the total weight of the polymer dispersion, more preferably from about 45 weight percent to about 55 weight percent.

The aqueous copolymer dispersions used to form the binder coating or adhesive layer-forming compositions herein can be desirably low in Total Volatile Organic Compound (TVOC) content. A volatile organic compound is defined herein as a carbon containing compound that has a boiling point below 250° C. (according to the ISO 11890-2 method for polymer dispersions TVOC content determination) at atmospheric pressure. Compounds such as water and ammonia are excluded from VOCs.

The aqueous copolymer dispersions used herein will generally contain less than 3% TVOC by weight based on the total weight of the aqueous copolymer dispersion. Preferably the aqueous copolymer dispersion will contain less than 1% TVOC by weight based on the total weight of the aqueous copolymer dispersion; more preferably the aqueous copolymer dispersion will contain less than 0.5% TVOC by weight based on the total weight of the aqueous copolymer dispersion, most preferable below 0.3% TVOC according to ISO 11890-2, described hereinafter in the Test Methods section.

Where appropriate, the vinyl acetate/ethylene copolymer dispersions used herein can also optionally comprise a wide variety of conventional additives which are typically used in the formulation of binders and/or adhesives. Such optional additives may be present in the copolymer dispersion from the beginning of or during polymerization, may be added to the dispersion post-polymerization or, such as in the case of fillers, may be used in connection with preparation of the aqueous coating compositions from the copolymer dispersions as hereinafter described.

Typical conventional optional additives for the copolymer dispersions herein can include, for example, film-forming assistants, such as white spirit, Texanol®, TxiB®, butyl glycol, butyl diglycol, butyl dipropylene glycol, and butyl tripropylene glycol; wetting agents, such as AMP 90®, TegoWet.280®, Fluowet PE®; defoamers, such as mineral oil defoamers or silicone defoamers; UV protectants, such as Tinuvin 1130®; agents for adjusting the pH; preservatives; plasticizers, such as dimethyl phthalate, diisobutyl phthalate, diisobutyl adipate, Coasol B®, Plastilit 3060®, and Triazetin®; subsequently added stabilizing polymers, such as polyvinyl alcohol or additional cellulose ethers; and other additives and auxiliaries of the kind typical for the formulation of binders and adhesives. The amounts of these additives used in the VAE copolymer dispersions herein can vary within wide ranges and can be selected by the specialist in view to the desired area of application.

Filler

The aqueous carpet coating compositions herein also will contain a carbon black filler and optionally a selected type of further particulate inorganic filler material.

Carbon black [C.A.S. NO. 1333-86-4] is virtually pure (normally greater than 97% pure) elemental carbon in the form of colloidal particles that are produced by incomplete combustion or thermal decomposition of gaseous or liquid hydrocarbons under controlled conditions. Carbon black is generally available in two forms; furnace black which is produced from heavy aromatic oils as feedstock and thermal black which is produced from natural gas, consisting primarily of methane, as feedstock material. Both furnace black and thermal black can be used in the present coating compositions.

The carbon black filler is preferably a dispersion having a solids content between 20 and 70%.

The further particulate filler material can be selected from particulate inorganic compounds and combinations of such particulate inorganic compounds with particulate plastic materials. At least a portion, and preferably substantially all, of the inorganic particulate filler component of the coating compositions herein will comprise a particulate carbon material and/or fly ash. The particulate filler material can generally range in average particle size between about 200 nm and 1000 μm, more preferably between about 1 μm and 500 μm, most preferably 10 μm-300 μm.

The preferred further particulate material for use herein is carbon. Particulate carbon material can be selected from activated carbon, charcoal, graphite, and combinations of these carbon materials. Such carbon materials can serve to impart odor-absorbing and odor-controlling properties to the carpet products into which the coating compositions herein have been incorporated.

The further particulate filler component of the carpet coating compositions herein may also comprise fly ash. Fly ash is produced as the residue from the burning of coal. Fly ash generally comprises substantial amounts of silicon dioxide ($SiO_2$) and calcium oxide (CaO).

The further particulate filler component of the compositions herein can optionally contain, in addition to the particulate carbon and/or fly ash material, other filler material conventionally added to coating products commonly used in carpet manufacture. Such fillers are widely commercially available and can include, for example, inorganic, e.g., mineral, fillers or pigments such as ground glass, calcium carbonate, clay, kaolin, talc, barites, feldspar, titanium dioxide, calcium aluminum pigments, satin white, zinc oxide, barium sulphate, gypsum, silica, mica, and diatomaceous earth. Particulate plastic material such as synthetic polymer pigments, hollow polymer pigments and recycled carpet backing may also optionally be employed, as can mixtures of any of the foregoing filler types.

Aqueous Binder Coating and Adhesive Compositions

The copolymer dispersions as hereinbefore described are combined with filler material and additional water and any optional other ingredients to form the aqueous carpet coating compositions herein. The solids content of the aqueous compositions so formed will generally range from about 30 wt % to about 70 wt % of the total composition. More preferably, the solids content of the aqueous carpet coating compositions herein will range from about 40 wt % to about 60 wt % of the total composition.

The solids within the aqueous coating compositions will comprise both copolymer solids and filler material. Preferably, the compositions herein will comprise from about 2.5 to about 50 weight percent, more preferably from about 10 to about 40 weight percent, and more preferably from about 20 to about 30 weight percent of dry copolymer solids and from about 50 to about 97.5 weight percent, preferably about 60 to about 90 weight percent, and most preferably from about 70 to 80 weight percent of filler, based on total weight of solids in the aqueous composition. Within the compositions herein, the weight ratio of dry copolymer solids to dry filler material can range from about from about 2:1 to about 10:1.

The aqueous coating composition/formulation herein upon initial preparation should have a Brookfield viscosity of from about 500 mPa·s to 10.000 mPa·s at 25° C. Such compositions will generally vary in Brookfield viscosity by no more than about 100% after storage for up to about 7 days at a temperature of about 25° C.

The aqueous compositions herein with their VAE copolymer dispersion component stabilized with emulsifiers and cellulose ether and their carbon and/or fly ash filler material exhibit especially desirable viscosity stability after preparation. Between preparation and application to carpet products, these aqueous coating compositions exhibit no undesirable increase in viscosity. The compositions herein will thus vary in Brookfield viscosity by no more than about 100%, and preferably by no more than about 80%, after storage for up to about 7 days at a temperature of about 25° C.

The aqueous carpet coating compositions herein can contain, in addition to the copolymer dispersions and filler materials hereinbefore described, a variety of additional conventional additives in order to modify the properties thereof. Among these additives may be included thickeners, rheology modifiers, dispersants, colorants, biocides, antifoaming agents, etc. These optional additives are largely the same as those described above with respect to the copolymer dispersions used to form the coating compositions herein Carpet Products The aqueous coating compositions as hereinbefore described are applied to the flexible substrate(s) which form the carpet products herein. Upon drying, the applied aqueous coating compositions then provide the coating, i.e., binder, and/or adhesive layers within the carpet products. The carpet products can comprise only one or more than one adhesive or binder coating layer.

The carpet products herein can optionally also comprise a second separate layer which can be an adhesive layer to secure a secondary backing substrate to an already cured coated primary backing. In one embodiment, the carpet product can comprise both a binder coating layer and an adhesive layer which are formed from the same type of aqueous composition. Alternatively, the carpet products herein can comprise both a binder coating layer and an adhesive layer, wherein the two layers are formed from different aqueous compositions, with at least the binder coating layer, and preferably both layers, being formed from the type of VAE-based aqueous compositions described herein.

The coating compositions hereinbefore described form the coating, i.e., binder, and/or adhesive layer(s) in the carpet products herein which will also comprise at least one flexible substrate. Such flexible substrates can, for example, be selected from nonwovens, wovens, unidirectional weaves, knitted fabrics and pile fabrics. Thus the carpet products herein can be conventional tufted carpet, non-tufted carpet or needle-punched carpet. Such carpet products can be prepared by applying and drying the emulsion copolymer-containing aqueous compositions using equipment which is readily available in most carpet mills.

Pile carpet products comprise a primary backing with pile yarns extending from the primary backing substrate to form pile tufts. Pile or tufted carpet can be prepared by a) tufting or needling yarn into a woven or non-woven backing substrate; b) applying the aqueous carpet coating composition as described herein to the rear of the backing such that the yarn is embedded in the carpet coating composition; and c) drying the resultant carpet construction. In producing such tufted carpets, it is also desirable to apply a secondary backing to the primary backing either before or after drying of the carpet coating, depending upon the type of backing employed.

The carpet products herein can also be non-tufted carpets wherein the fibers are embedded into a coating or binder composition which has been coated onto a woven or non-woven substrate. Non-tufted carpets also may be prepared by a) coating an aqueous composition such as hereinbefore described onto a substrate; b) embedding the carpet fibers in the substrate; and c) drying the resultant carpet construction. In forming a non-tufted carpet, the carpet coating can be thickened and applied to a scrim surface. The fibers then are directly embedded into the wet coating using conventional techniques and then dried. These non-tufted carpets also may be advantageously prepared utilizing a secondary backing that can provide additional dimensional stability. Another type of non-tufted carpet that can advantageously use the present coating composition is needle felt carpet, which is produced by the electrostatic attraction of individual synthetic fibers, which are bonded to create an entire carpet.

In preparing the carpet products herein, the aqueous composition is applied in a manner such that it penetrates the fibers of the carpet yarns to yield better adhesion, fiber bundle integrity, anti-fuzzing properties and suitable tuft-bind values. Suitable carpet performance properties can be achieved by applying an amount of the aqueous coating/binder composition ranging from about 100 $g/m^2$ to about 3000 $g/m^2$, more preferably from about 200 $g/m^2$ to about 2000 $g/m^2$, and most preferably from about 400 $g/m^2$ to about 1500 $g/m^2$ (dry basis).

Carpet Product Characteristics

The carpet products of this development with their particulate carbon and/or fly ash filler material applied via the coating compositions herein have especially desirable odor control properties. Particulate carbon, for example, present in the binder or adhesive layer of the carpet can absorb unpleasant or undesirable odors to which the carpet product may be subjected or exposed in use. Odor control characteristics are especially pronounced at the higher levels of filler incorporated into the carpet products, which the present development permits.

The carpet products herein, with the specific type of vinyl acetate/ethylene-based copolymer dispersions used in forming coating and/or adhesive layers, also have especially desirable, environmentally friendly characteristics. The copolymer dispersions used, by virtue of preferably containing no cross-linking groups which generate formaldehyde (e.g. no NMA or NMA-LF), and by virtue of their low TVOC content and TVOC emission, do not cause potentially problematic materials of this type to be emitted from the carpet products herein. The carpet products herein, in fact will generally emit TVOC materials to the extent of no more than about 5 times the Toluene D8 standard, when carpet products are tested in accordance with the procedures of ISO 16000-9, described hereinafter in the Test Methods section. Further, since the carpet products herein do not utilize SBL coatings or binders, the carpet product will also be substantially free of potentially toxic components such as 4-phenylcyclohexene (4-PCH), 4-vinylcyclohexene (4-VCH), styrene, and ethylbenzene.

The carpet products herein, with the specific type of vinyl acetate/ethylene-based copolymers used in forming coating and/or adhesive layers, are also desirably resistant to degradation upon exposure to light having both visible and ultraviolet (UV) components. This can be demonstrated by testing the carpet products herein for both tuft anchorage (for example, in accordance with ISO 4919) before and after prolonged exposure to visible light and/or UV radiation.

The carpet products herein, with the specific type of vinyl acetate/ethylene-based copolymers used in forming coating and/or adhesive layers, show a very good aging stability. This can be demonstrated by testing the carpet products herein for both tuft anchorage (for example, again in accordance with ISO 4919) before and after prolonged exposure to time and temperature.

EXAMPLES

The aqueous coating compositions and carpet products having such compositions incorporated therein are more particularly described with reference to the following non-limiting Examples. The several test methods employed in connection with these Examples are described as follows:

Test Methods

Copolymer Dispersion Particle Size Determination

The size of solid particles within the copolymer dispersions used herein can be determined by laser aerosol spectroscopy (LAS). This LAS method is described in the publication *Kunstharz Nachrichten* 28; "Characterization and Quality Assurance of Polymer Dispersions"; October 1992, Dr. J. Paul Fischer. The method uses a Nd:YVO4 Laser (Millenia II) supplied by Spectra Physics with a laser power of 2 W and a wave length of 532 nm. The detector is a Bialkali Photocathode Type 4517 supplied by Burle (formerly RCA). The scattered light of the spray dried single particles will be detected at 40°. The evaluation of the data is done with a multi-channel analyzer by TMCA with 1024 channels.

To make the particle size determination, 0.2 ml of a dispersion sample is diluted in 100 ml of deionized and filtered water (conductivity of 18.2 µS/m). The sample is spray dried over a Beckmann-nozzle and dried with nitrogen gas. The single particles are neutralized with beta radiation (Kr-85) and then investigated by single particle laser scattering. After evaluation the number and mass mean values within the range of 80 nm to 550 nm and mean particle size values $d_n$, $d_w$, $d_z$ and $d_w/d_n$ are obtained.

Copolymer Glass Transition Temperature ($T_g$) Determination

The glass transition temperature, $T_g$, can be obtained by using a commercial differential scanning calorimeter Mettler DSC 820 at 10 K/min. For evaluation, the second heating curve is used and the DIN mid point calculated.

Solids Content of Copolymer Dispersions or Coating Compositions

Solids content is measured by drying 1 to 2 grams of the aqueous dispersion or coating composition at 105° C. for 4 hours, and by then dividing the weight of dried polymer by the weight of dispersion or composition.

Viscosity of Coating Compositions

Viscosity is determined at 25° C. using a Brookfield DV-I+ Viscometer, with spindle 3, speed 20 rpm.

Copolymer Dispersion Volatile Organic Compound (VOC) Content (ISO 11890-2)

The total volatile organic compound content of the copolymer dispersion can be measured by using the ISO 11890-2 test method, which test method is incorporated herein by reference. This method determines the residual levels of Volatile Organic Components (VOC) by direct injection into a capillary gas chromatographic column. The method follows the DIN ISO 11890-2 directive where TVOC is defined as the sum of all volatile organic components with a boiling point lower than tetradecane. This component has a boiling point of 253° C.

A Perkin Elmer Gas Chromatograph (Auto system X.L) fitted with PPC (Pneumatic Pressure control) is used with a Varian column V624, 60 meters, 320 µm internal diameter and 1.8 µm film thickness. The carrier gas is $H_2$. The detector is a FID.

For sample preparation, approximately 150 µl of sample is placed into a tared vial using a Gilson Micromann 250 positive displacement pipette. The auto sampler vial is weighed (g), and the result is noted as the divisor value. Approx. 1.5 ml of diluent solution (containing 100 ppm of methyl isobutyl ketone (MIBK) in deionized water as internal standard) is added to the auto sampler vial. The auto sampler vial is weighed (g), and the result is noted as the multiplier. The auto sampler vial is mixed thoroughly using a vortex mixer until the solution in the vial is completely homogenous. The sample vial is then placed on the sampling carousel of the Gas Chromatograph and measured according to ISO 11890-2. Each single VOC is calibrated initially. The result is the sum of all singles VOC values which is the Total Volatile Organic Component (TVOC) parameter in ppm.

Grit Measurement

All prepared formulation are tested for grit formation with time. In each case, 10 g of the formulation is weighted into a beaker. The mixture is carefully and slowly diluted with 300 ml of deionized water and stirred slowly to separate the grit particles from the soluble formulation parts. Afterwards it is filtered through a 400 µm filter. The filter material is weighed before use. The residual on the filter is carefully washed with 300 ml of deionized water. The filter material is dried at a temperature of 130° C. for 30 min and again weighed. The grit amount is calculated as a percentage of the original solid content of the mixture. The grit is measured after 7 and 14 days.

Example 1

Preparation of VAE-Based Copolymer Dispersion

Into a pressure reactor fitted with an anchor stirrer (running at 150 rpm), a heating jacket, dosage pumps and having a volume of 68.6 liters, a water based solution of the following components is added:

| | |
|---|---|
| 23241 g | Water (deionized) |
| 341 g | Natrosol 250 GR (Hydroxy ethyl cellulose ether). |
| 189 g | Natrosol 250 LR (Hydroxy ethyl cellulose ether) |
| 86 g | Sodium acetate (anhydrous) |
| 566 g | Sodium vinylsulfonate (30%) |

| 1547 g | Disponil A 3065 - nonionic emulsifier (65% active) |
| 0.11 g | Mohr's Salt |

The Natrosol 250 GR and LR are dissolved in deionized water at 90° C. for 2 hours. The reactor is purged with nitrogen to eliminate oxygen. Out of a total amount of 29495 g of vinyl acetate, 5% of the vinyl acetate is added to the water phase in the reactor. The ethylene valve is opened and the reactor is pressurized to 15 bar at ambient temperature (ca. 1000 g of ethylene) and is then closed again (total amount of ethylene: 4187 g). The reactor temperature is ramped up to 60 C. At 35 C, 5% of a reducer solution (total amount: 44 g sodium meta bisulfite in 2830 g of deionized water) is added quickly into the reactor. At 50° C., 5% of a oxidizer solution (30 g of t-butyl hydroperoxide (70% in water) in 4528 g of deionized water), is added quickly into the reactor.

At 60° C., the vinyl acetate feed is started and is introduced into the reactor in 300 minutes. At the same time, the ethylene valve is opened again until the rest of the ethylene is fed into the reactor (approx. 36 bar). At the same time, all initiator feeds are introduced within 360 minutes. The reactor is then cooled down to approximately 40 C. A final redox treatment can be made at this point by introducing Brüggolit FF6 (a sodium salt of a sulfinic acid derivative, obtained from L. Brüggemann KG) (33 g in 489 g of deionized water) and afterwards Trigonox AW 70 (95).

The Example 1 VAE copolymer dispersion has the following characteristics:

| Solids content: | 55.1% |
| pH: | 4.7 |
| Viscosity Brookfield (25° C., Spindel 4, 20 rpm): | 5700 mPas |
| Residual vinyl acetate: | <0.1% |
| Glass transition temperature, $T_g$, (10K/min, mid point): | 9.6° C. |
| Particle size distribution (LAS): | $d_w$ = 229 nm |
| | $d_w/d_n$ = 1.5 |
| TVOC (ISO 11890-2) | 970 ppm |

Example 2 (Comparative)

Preparation of Alternate VAE-Based Copolymer Dispersion

Into a pressure reactor fitted with an anchor stirrer (running at 150 rpm), a heating jacket, dosage pumps and having a volume of 27 liters, a water based solution of the following components is added:

| 9949 g | Water (deionized) |
| 534 g | Polyvinyl alcohol solution (15%) in deionized water, i.e., partially hydrolyzed [88 hydrolysis (mole %)] that forms a 4% solution viscosity of 23 mPas ± 3.0 at 20° C. |
| 32.0 g | Sodium acetate (anhydrous) |
| 213 g | Sodium vinylsulfonate (30%) |
| 533 g | Alkyl polyglycol ether (28 mols of Ethylene Oxide) - nonionic emulsifier (70% by weight in water) |
| 416 g | sodium dodecylsulfate - ionic emulsifier (15% by weight in water) |
| 5.0 g | Sodium metabisulfite |
| 0.03 g | Mohr's Salt |

The polyvinyl alcohol is dissolved 15% in deionised water at 90° C. for 2 hours. The reactor is purged with nitrogen to eliminate oxygen. Out of a total amount of 12080 g of vinyl acetate, 5.0% of the vinyl acetate is added to the water phase in the reactor. The ethylene valve is opened, and the reactor is pressurized to 15 bar at ambient temperature and is then closed again (total amount of ethylene: 503 g). The reactor temperature is ramped up to 65° C. At 35 C, a First Initiator which is sodium peroxo disulfate (28 g in 223 g of deionized water) is added quickly (over ca. 8 minutes) into the reactor.

At 65° C., the vinyl acetate feed is started and is the remaining 95% of the vinyl acetate is introduced into the reactor in 240 minutes. At the same time the ethylene valve is opened again until the rest of the ethylene is fed into the reactor. After 210 minutes of vinyl acetate feeding time, a Second Initiator feed (13 g of sodium peroxodisulfate in 223 g of deionized water) is started for approximately 30 minutes. After the vinyl acetate feed is finished, the reactor temperature is ramped up to 85° C. within 30 minutes. This temperature is maintained for another 30 minutes. The reactor is then cooled down to approximately 40° C. A final redox treatment can be made at this point by introducing Brüggolit FF6 (a sodium salt of a sulfinic acid derivative, obtained from L. Brüggemann KG) (20 g in 120 g of deionized water) and afterwards Trigonox AW 70 (37 g).

The Example 2 VAE copolymer dispersion has the following characteristics:

| Solids content: | 53.5% |
| pH: | 4.7 |
| Viscosity Brookfield (25° C., Spindel 4, 20 rpm): | 270 mPas |
| Residual vinyl acetate: | <0.1% |
| Glass transition temperature, $T_g$, (10 K/min, mid point): | 27° C. |
| Particle size distribution (LAS): | $d_w$ = 218 nm |
| | $d_w/d_n$ = 1.4 |

Example 3 and Example 4 m (Comparative)

Preparation and Evaluation of VAE/Carbon Black Dispersions

The polymer dispersions of Examples 1 and 2 are diluted to 50% solids and are blended in a ratios of 1:2.5 (ratio refers to the solid content of the dispersions) with a commercially available carbon black dispersion. A typical commercially available example is Supronil RA 88 as available by Weserland GmbH. The carbon black dispersion has a solids content of 39% and a pH of 8 and is stabilized with anionic surfactants. The compositions of the resultant blends are summarized in Table 1.

TABLE 1

Aqueous Coating Compositions with Copolymer Dispersion + Filler

| Composition Example No. | Copolymer Disperion Example No. | Copolymer Dispersion Stabilizer | Copolymer Dispersion $T_g$ (° C.) | Filler Type | Filler (carbon black dispersion)/Copolymer (Dispersion) Ratio | Solids Content of coating formulation (wt %) |
|---|---|---|---|---|---|---|
| 3 | 1 | Emulsifier + HEC | +10 | Carbon black dispersion | 1.0.2.5 | 46 |
| 4 (Comp) | 2 (Comp) | Emulsifier + PVOH | +29 | Carbon black dispersion | 1.0:2.5 | 46 |

Each of the coating formulations set forth in Table 1 is tested for its initial viscosity and its viscosity after storage for 7 days and 14 days at room temperature. In addition, each blend is tested for grit formation after storage for 7 days and 14 days at room temperature. The results for the viscosity and grit tests are shown in Table 2.

TABLE 2

Viscosity and Grit Characteristics of Aqueous Coating Compositions

| Composition Formulation Example No. | Copolymer Dispersion Stabilizer | Initial Viscosity (mPs · s) | Viscosity After (mPa · s) 7 Days | Viscosity After (mPa · s) 14 Days | Grit After (% solids) 7 Days | Grit After (% solids) 14 Days |
|---|---|---|---|---|---|---|
| 3 | Emulsifier + HEC | 1834 | 3205 | 3885 | 1.28 | 1.4 |
| 4 | Emulsifier + PVOH | 2430 | 8700 | 11380 | 2.38 | 2.93 |

The results in Table 2 show that, at a filler to copolymer ratio of 1:2.5, the blend using the copolymer dispersion of Example 1 exhibits significantly reduced viscosity increase on storage as compared with the blend using the copolymer dispersion of Example 2

What is claimed is:

1. An aqueous carpet binder or adhesive coating composition comprising:
  A) an emulsifier- and protective colloid-stabilized vinyl acetate/ethylene copolymer dispersion wherein the vinyl acetate/ethylene copolymer therein comprises main co-monomers which include a vinyl acetate co-monomer copolymerized with ethylene and optionally copolymerized also with one or more additional different non-functional main co-monomer(s) based on vinyl esters of $C_1$-$C_{18}$ mono-carboxylic acids or $C_1$-$C_{18}$ esters of ethylenically unsaturated mono-carboxylic acids or $C_1$-$C_{18}$ diesters of ethylenically unsaturated di-carboxylic acids, said vinyl acetate/ethylene copolymer having a glass transition temperature, $T_g$, between about 0° C. to about 25° C.; and
  B) at least one carbon black based filler;
  wherein:
    i) said carbon black based filler is in the form of a dispersion/slurry with a solids content between 20 and 70%;
    ii) said vinyl acetate/ethylene copolymer dispersion is stabilized with a protective colloid component comprising a cellulose ether or a derivative thereof; and
    iii) said coating composition has a Brookfield viscosity upon initial preparation of from about 500 mPa·s to 10,000 mPa·s and varies in Brookfield viscosity by no more than about 100% after storage for up to about 7 days at a temperature between about 20° C. and 30° C.,
  and wherein a weight ratio of dry copolymer solids to dry filler solids is from about 2:1 to 10:1.

2. The coating composition according to claim 1 which has a solids content ranging from about 40 wt % to about 60 wt % of the total composition.

3. The coating composition according to claim 1 wherein the solids material therein comprises about 2.5 wt % to about 50 wt % of dry copolymer solids and from about 50 wt % to about 97.5 wt % of filler solids.

4. The coating composition according to claim 1 wherein said copolymer dispersion is stabilized with at least about 0.5 wt %, based on total main co-monomers in said copolymer, of one or more emulsifiers and from about 1 wt % to about 4 wt %, based on total main co-monomers in said copolymer, of said protective colloid.

5. The coating composition according to claim 1 wherein said cellulose ether protective colloid is selected from methyl cellulose, hydroxyethyl cellulose, hydroxypropyl cellulose, hydroxypropyl methyl cellulose, ethyl hydroxyethyl cellulose and methyl hydroxyethyl cellulose.

6. The coating composition according to claim 1 and further comprising C) a further particulate filler material other than carbon black selected from particulate inorganic compounds and combinations of particulate inorganic compounds with particulate plastic material.

7. The coating composition according to claim 6 wherein said inorganic particulate filler comprises at least some fly ash and/or particulate carbon material.

8. The coating composition according to claim 1 wherein said vinyl acetate/ethylene copolymer in the copolymer dispersion is substantially free of cross-linkable co-monomer moieties which generate formaldehyde upon formation of said coating.

9. The coating composition according to claim 1 wherein the vinyl ester/ethylene copolymer dispersion comprises a vinyl acetate-ethylene copolymer comprising from about 5 wt % to about 25 wt % of ethylene, based on total main co-monomers therein.

10. The coating composition according to claim 1 wherein the copolymer dispersion is emulsifier-stabilized with an emulsifier component which comprises anionic and/or non-ionic surfactants but which contains substantially no alkylphenol ethoxylates.

11. The coating composition according to claim 1 wherein the copolymer dispersion has a Total Volatile Organic Compound (TVOC) content, as determined by ISO 11890-2, of less than about 1.0% based on the total weight of the copolymer dispersion.

12. A carpet product comprising at least one flexible substrate and at least one binder coating layer associated with said at least one flexible substrate, said binder coating layer being formed from an aqueous coating composition according to claim 1.

13. The carpet product according to claim 12 wherein the flexible substrate therein is selected from nonwovens, wovens, unidirectional weaves, knitted fabrics and pile fabrics.

14. The coating composition according to claim 5 wherein said cellulose ether protective colloid is hydroxyethyl cellulose.

* * * * *